(12) United States Patent
Buchecker et al.

(10) Patent No.: US 6,340,506 B1
(45) Date of Patent: Jan. 22, 2002

(54) PHOTOCROSSLINKABLE POLYIMIDES

(75) Inventors: Richard Buchecker, Zurich (CH); Guy Marck, Schlierbach; Olivier Muller, Lautenbach, both of (FR)

(73) Assignee: Rolic Ag, Zug (CH)

( * ) Notice: Subject to any disclaimer, the term of this patent is extended or adjusted under 35 U.S.C. 154(b) by 0 days.

(21) Appl. No.: 09/534,136

(22) Filed: Mar. 23, 2000

Related U.S. Application Data

(63) Continuation of application No. PCT/IB98/01425, filed on Sep. 15, 1998.

(30) Foreign Application Priority Data

Sep. 25, 1997 (CH) .............................................. 2257/97

(51) Int. Cl.[7] .................... C09K 19/00; C09K 19/38; C08F 2/46; C08J 3/28
(52) U.S. Cl. .................... 428/1.26; 428/1.27; 430/20; 430/287.1; 349/183; 349/193; 522/149; 522/164; 528/335; 528/345
(58) Field of Search ................ 522/149, 164; 430/20, 287.1; 428/1.26, 1.27; 252/299.1, 299.7; 349/123, 127, 135, 136, 183, 193; 528/335, 345

(56) References Cited

U.S. PATENT DOCUMENTS

| 3,897,395 | A |   | 7/1975  | D'Alelio       |
| 4,168,360 | A |   | 9/1979  | D'Alelio       |
| 4,321,319 | A |   | 3/1982  | Shoji et al.   |
| 4,778,859 | A | * | 10/1988 | Ai et al.      |
| 4,879,059 | A |   | 11/1989 | Hanyu et al.   |
| 5,129,727 | A |   | 7/1992  | Hanyu et al.   |
| 5,252,251 | A |   | 10/1993 | Sato et al.    |
| 5,326,496 | A |   | 7/1994  | Iida et al.    |
| 5,446,074 | A | * | 8/1995  | Czornyj et al. |
| 5,449,742 | A |   | 9/1995  | Beuhler et al. |
| 5,539,074 | A |   | 7/1996  | Herr et al.    |
| 5,594,093 | A |   | 1/1997  | Sotoyama et al.|
| 5,623,354 | A | * | 4/1997  | Lien et al.    |
| 5,644,016 | A |   | 7/1997  | Roschert et al.|
| 5,759,442 | A |   | 6/1998  | Auman et al.   |
| 5,777,068 | A |   | 7/1998  | Tanaka et al.  |
| 5,824,377 | A | * | 10/1998 | Pirwitz et al. |
| 5,965,761 | A | * | 10/1999 | Buchecker et al.|
| 6,084,057 | A | * | 7/2000  | Gibbons et al. |

FOREIGN PATENT DOCUMENTS

| EP | 0611 786 A | 8/1994 |
| EP | 0763 552 A | 3/1997 |

* cited by examiner

Primary Examiner—Susan W. Berman
(74) Attorney, Agent, or Firm—Finnegan, Henderson, Farabow, Garrett & Dunner, L.L.P.

(57) ABSTRACT

The invention relates to novel crosslinkable, photoactive polymers from the class of polyimides, polyamide acids and esters thereof, and to their use as orientation layers for liquid crystals and in the construction of unstructured and structured optical elements and multi-layer systems. The polymers contain as side-chains photo-crosslinkable groups of the following formula:

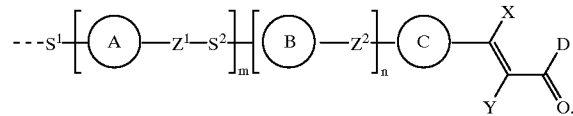

The broken line indicates the point of linkage to the polymer main chain. In addition, A, B each independently of the other represents unsubstituted or optionally fluoro-, chloro-, cyano-, alkyl-, alkoxy-, fluoroalkyl- or fluoroalkoxy-substituted phenylene, pyridine-2,5-diyl, pyrimidine-2,5-diyl, cyclohexane-1,4-diyl, piperidine-1,4-diyl, piperazine-1,4-diyl;

C represents unsubstituted or optionally fluoro-, chloro-, cyano-, alkyl-, alkoxy-, fluoroalkyl- or fluoroalkoxy-substituted phenylene, or pyrimidine-2,5-diyl, pyridine-2,5-diyl, 2,5-thiophenylene, 2,5-furanylene, 1,4- or 2,6-naphthylene.

20 Claims, No Drawings

PHOTOCROSSLINKABLE POLYIMIDES

This application is a continuation of International Application No. PCT/IB98/01425, filed Sep. 15, 1998, the content of which is incorporated herein by reference.

The invention relates to novel crosslinkable, photoactive polymers from the class of polyimides, polyamide acids and esters thereof, and to their use as orientation layers for liquid crystals and in the construction of unstructured and structured optical elements and multi-layer systems.

In (electro-optical) liquid crystal devices the orientation layer is of particular importance. It serves to ensure a uniform and trouble-free alignment of the longitudinal axes of the molecules.

For the orientation of liquid crystal molecules in liquid crystal displays (LCDs) it is customary to use uniaxially rubbed polymer orientation layers, such as, for example, polyimide. The direction of rubbing in that process gives the direction of orientation. Especially for use in LCDs, however, in addition to giving the direction of orientation it is also necessary for an angle of tilt to be imparted by the orientation layer. That angle can be produced on the mentioned polymer surfaces likewise by the rubbing process. When a liquid crystal is brought into contact with such a surface, the liquid crystal molecules do not lie parallel to the surface but at an angle thereto, that is to say the angle of tilt is transferred to the liquid crystal. The size of the angle of tilt is determined both by rubbing parameters, such as, for example, rate of advance and contact pressure, and by the chemical structure of the polymer. For the production of liquid crystal displays, angles of tilt of between 1° and 15° are required, depending upon the type of display. The larger angles of tilt are required especially for supertwisted nematic (STN) LCDs in order to avoid the formation of so-called fingerprint textures. In TN and TFT-TN LCDs, the direction of rotation and of tilting is defined by the angle of tilt, so that "reverse twist" and "reverse tilt" phenomena are prevented. Whereas, in the switched-off state, reverse twist results in areas having the incorrect direction of rotation (which manifests itself optically in the display having a spotty appearance), reverse tilt becomes particularly apparent when the LCD is switched on, causing very troublesome optical effects as a result of the liquid crystals tilting in different directions. Reverse twist can be prevented by doping the liquid crystal mixture with a chiral doping agent. To suppress reverse tilt there has hitherto been no alternative to the use of orientation layers having an angle of tilt.

The above-described orientation by rubbing is associated with some serious disadvantages, however, that can have a marked effect on the optical quality of the liquid crystal displays. For example, the rubbing process produces dust which can result in optical defects in the display. At the same time the polymer layer becomes electro-statically charged, which may, for example in the case of thin film transistor. (TFT)-TN LCDs, result in the destruction of the underlying thin layer transistors. For those reasons the yield of displays that are free of optical defects has not been optimum in LCD production hitherto.

A further disadvantage of the rubbing process is that it is not possible to produce structured orientation layers in a simple manner, since local variation of the direction of orientation is not possible in the rubbing process. Rubbing is therefore used chiefly to produce layers having uniform alignment over a large area. Structured orientation layers are of great interest, however, in many areas of display technology and integrated optics. For example, they can be used in improving the viewing angle dependency of twisted nematic (TN) LCDs.

To improve viewing angle dependency,. LCDs having pixels that alternate in respect of angle of tilt were proposed some time ago (e.g. EP-A-0 683 418). That proposal was based on the realisation that the angles of tilt of polyimide layers change at sites which have been irradiated beforehand with laser light. That change is based on the destruction of some of the imide bonds at the site of irradiation, for which purpose comparatively short wavelengths and high light intensities are required. Using that procedure it is possible in principle to produce orientation layers having domains with different angles of tilt. The disadvantages lie, however, in the high irradiation energy required for the purpose and the comparatively long irradiation time. In addition, the orientation of the longitudinal axes of the molecules in the plane of the layer is produced, as before, by rubbing, so that the above-mentioned problems arising in the rubbing process cannot be eliminated. In particular, that procedure cannot be used to produce structured surface orientations.

Orientation layers in which the direction of orientation can be predetermined by irradiation with polarised light have been known for some time. It is by that means possible to avoid the problems inherent in the rubbing process. In addition, it is possible to provide areas having different directions of orientation and thus to structure the orientation layer.

One possible method for the structured orientation of liquid crystals utilises the isomerisation capacity of certain dye molecules to induce a preferred direction photo-chemically by irradiation with polarised light of a suitable wavelength. This is achieved, for example, by mixing a dye into an orientation polymer, which is then irradiated with polarised light. Such a guest/host system is described, for example, in U.S. Pat. No. 4,974,941. In that system, azobenzenes are mixed into polyimide orientation layers and then irradiated with polarised light. Liquid crystals that are in contact with the surface of a layer so irradiated become oriented in accordance with that preferred direction. That orientation process is reversible, that is to say by further irradiation of the layer with light of a second direction of polarisation it is possible for the direction of orientation that has already been established to be changed round again. Since that reorientation process can be repeated as often as desired, orientation layers on that basis are less suitable for use in LCDs.

Another possible method of producing high-resolution orientation patterns in liquid crystalline layers is described in *Jpn. J. Appl. Phys.*, Vol. 31 (1992), 2155. In that process the dimerisation of polymer-bonded photoreactive cinnamic acid groups induced by irradiation with linearly polarised light is employed for the structured orientation of liquid crystals. Unlike the reversible orientation procedure described above, in the case of the photostructurable orientation layers described in *Jpn. J. Appl. Phys.*, Vol. 31 (1992), 2155 an anisotropic polymer network is synthesised. Those photo-oriented polymer networks can be used wherever structured or unstructured liquid crystal orientation layers are required. In addition to their use in LCDs, such orientation layers can also be used, for example, in the production of so-called hybrid layers, as exemplified in European Patent Applications EP-A-0 611 981, EP-A-0 689 084, EP-A-0 689 065 and EP-A-0 753 785. Using those hybrid layers of photostructured orientation polymers and crosslinkable low molecular weight liquid crystals it is possible to realise optical elements such as, for example, non-absorptive colour filters, linear and circular polarisers, optical delay layers and so on.

EP-A-0 611 786, EP-A-0 763 552 and WO-A-96/10049 describe cinnamic acid polymers that are suitable in, principle for the synthesis of such anisotropically crosslinked, photostructured orientation layers for liquid crystals. In the case of the compounds described in EP-A-0 763 552 and WO-A-96/10049, on irradiation with linearly polarised light it is possible, in addition to inducing the desired orientation, simultaneously to induce an angle of tilt. It is thus possible to produce layers having structuring in respect of surface orientation and angle of tilt.

The orientation layers formed from the polymers described in EP-A-0 611 786, EP-A-0 763 552 and WO-A-96/10049 have the disadvantage, however, that for certain applications, especially for use in TFT displays, they result in the adjacent liquid crystal mixture having an insufficient electrical resistance value. In TFT displays, too low a resistance value of the liquid crystal medium leads to an inadequate "holding ratio", which is a measure of the voltage drop in the display after the voltage has been switched off. Low holding ratio values, however, bring about undesirable changes in brightness and contrast over time and thus result in unstable graduations of the grey tones.

The problem underlying the invention was, therefore, to produce photoreactive polymers that, when irradiated with polarised light, result in the production of stable, high-resolution orientation patterns having a defined angle of tilt and at the same time result in sufficiently high resistance values (holding ratios) in the adjacent liquid crystal medium.

Surprisingly, it has now been found that polyimides that have in addition as side-chains groups derivable structurally from 3-arylacrylic acid are able to fulfil those conditions and are excellently suitable as orientation layers for liquid crystals. The crosslinking of those compounds using linearly polarised light results in excellent orientation of the liquid crystals, in an angle of tilt that can be set by the irradiation conditions and, at the same time, in an appreciable increase in the electrical resistance and holding ratio in the neighbouring liquid crystal medium.

The present invention therefore relates to side-chain polymers from the class of polyimides, polyamide acids and esters thereof, characterised in that they comprise as side-chains photocrosslinkable groups of the general formula I:

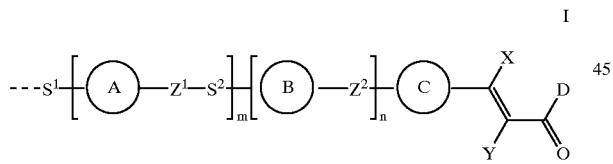

wherein the broken line indicates the point of linkage to the polymer main chain and wherein:

A, B each independently of the other represents unsubstituted or optionally fluoro-, chloro-, cyano-, alkyl-, alkoxy-, fluoroalkyl- or fluoroalkoxy-substituted phenylene, pyridine-2,5-diyl, pyrimidine-2,5-diyl, cyclohexane-1,4-diyl, piperidine-1,4-diyl, piperazine-1,4-diyl;

C represents unsubstituted or optionally fluoro-, chloro-, cyano-, alkyl-, alkoxy-, fluoroalkyl- or fluoroalkoxy-substituted phenylene, or pyrimidine-2,5-diyl, pyridine-2,5-diyl, 2,5-thiophenylene, 2,5-furanylene, 1,4- or 2,6-naphthylene;

D represents —$OR^1$—, —$NR^1$—, or an oxygen atom linked to ring C in the ortho-position to form a coumarin unit, wherein $R^1$ is an optionally fluoro- or chloro-substituted straight-chain or branched alkyl group having from 1 to 20 carbon atoms or an optionally fluoro-, chloro-, alkyl- or alkoxy-substituted cycloalkyl radical having from 3 to 8 ring atoms;

$S^1$ represents a single covalent bond or a spacer unit, such as a straight-chain or branched alkylene grouping represented by —$(CH_2)_r$—, optionally mono- or poly-substituted by fluorine, chlorine or cyano, or a chain of the formula L—$(CH_2)_r$—$L^2$— or $L^1$—$(CH_2)_r$—$L^2$—$(CH_2)_s$—$L^3$—, wherein $L^1$, $L^2$ and $L^3$ each independently of the others represents a single bond or linking functional groups such as —O—, —CO—O—, —O—CO—, —$NR^2$—, —$NR^2$—CO—, —CO—$NR^2$—, —$NR^2$—CO—O—, —O—CO—$NR^2$—, —$NR^2$—CO—$NR^2$—, —CH=CH—, —C≡C—, —O—CO—O—, wherein $R^2$ represents hydrogen or lower alkyl and r and s are each an integer from 1 to 20, with the proviso that r+s≦24;

$S^2$ represents a single covalent bond or a spacer unit, such as a straight-chain or branched alkylene grouping represented by —$(CH_2)_r$—, optionally mono- or poly-substituted by fluorine, chlorine or cyano, or a chain of the formula —$(CH_2)_r$—$L^1$— or —$(CH_2)_r$—$L^1$—$(CH_2)_s$—$L^2$—, wherein $L^1$ and $L^2$ each independently of the other represents a single bond or linking functional groups such as —O—, —CO—O—, —O—CO—, —$NR^2$—, —$NR^2$—CO—, —CO—$NR^2$—, —$NR^2$—CO—O—, —O—CO—$NR^2$—, —$NR^2$—CO—$NR^2$—, —CH=CH—, —C≡C—, —O—CO—O—, wherein $R^2$ represents hydrogen or lower alkyl and r and s are each an integer from 1 to 20, with the proviso that r+s≦24;

X, Y each independently of the other represents hydrogen, fluorine, chlorine, cyano, optionally fluoro-substituted alkyl having from 1 to 12 carbon atoms in which optionally one $CH_2$ group or two or more non-adjacent $CH_2$ groups may have been replaced by —O—, —CO—O—, —O—CO— and/or —CH=CH—;

$Z^1$, $Z^2$ each independently of the other represents a single covalent bond, —$(CH_2)_t$—, —O—, —CO—, —CO—O—, —O—CO—, —$NR^3$—, —CO—$NR^3$—, —$R^3N$—CO—, —$(CH_2)_u$—O—, —O—$(CH_2)_u$—, —$(CH_2)_u$—$NR^3$— or —$NR^3$—$(CH_2)_u$—; $R_3$ representing hydrogen or lower alkyl;

t represents an integer from 1 to 4;

u represents an integer from 1 to 3;

m represents 0 or 1;

n represents 0 or 1.

The term "polyimide" will be familiar to the person skilled in the art and is frequently used in the polymer literature, see, for example: *Polyimides*, Ed. K. L. Mittal, Vol. 1 and 2, 1984. It denotes a polymer the chain of which has been synthesised from a number of identical or different building blocks (monomers) in such a manner that the building blocks are linked to one another by imide bonds. Since the polyimides are generally synthesised by an imidisation reaction, for example by thermal condensation, from the corresponding polyamide, acids or from esters of the corresponding polyamide acids, such polyimides may contain, in addition to the imide groups, also proportions of amide acid groups or amide acid ester groups as linking functionalities. In addition, polyamide acids and polyamide acid esters that contain side-chains of the general formula I are important novel precursors of the polyimides according to the invention. They are therefore likewise a subject of the present invention.

The term "lower alkyl", taken on its own or in a combination such as "lower alkoxy", denotes straight-chain and branched saturated hydrocarbon radicals having from 1 to 6, preferably from 1 to 3, carbon atoms, such as methyl, ethyl, propyl or isopropyl and the like.

The term "alkyl", taken on its own or in a combination such as "alkoxy", denotes straight-chain and branched saturated hydrocarbon radicals having up to 20 carbon atoms.

The term "fluoroalkyl" denotes an alkyl radical as defined above wherein the hydrocarbon radicals are mono- or poly-substituted by fluorine. Examples of fluoroalkyl groups are: 2-fluoroethyl, trifluoromethyl, 2,2,2-trifluoroethyl, 1H,1H-pentadecafluorooctyl, 1H,1H,7H-dodecafluoroheptyl, 2-(perfluorooctyl)ethyl, 2-(perfluorobutyl)ethyl, 2-(perfluorohexyl)ethyl, 2-(perfluorodecyl)ethyl, perfluoropropyl, perfluorobutyl, perfluoroheptyl, perfluorooctyl, perfluorononyl.

The term "fluoroalkoxy" denotes an alkoxy radical as defined above wherein the hydrocarbon radicals are mono- or poly-substituted by fluorine. Examples of fluoroalkoxy groups are: 1-fluoropropoxy, 1-fluoropentyloxy, 2-fluoropropoxy, 2,2-difluoropropoxy, 3-fluoropropoxy, 3,3,3-difluoropropoxy, 3,3,3-trifluoropropoxy, trifluoromethoxy.

Preferred "spacer units" $S^1$ in the context of the present invention are a straight-chain or branched alkylene grouping, represented by $-(CH_2)_r-$, and also $-(CH_2)_r-O-$, $-(CH_2)_r-CO-$, $-(CH_2)_r-CO-O-$, $-(CH_2)_r-O-CO-$, $-(CH_2)_r-CO-NR^2-$, $-(CH_2)_r-NR^2-CO-$, $-(CH_2)_r-NR^2-$, $-O-(CH_2)_r-$, $-CO-O-(CH_2)_r-$, $-O-CO-(CH_2)_r-$, $-NR^2-CO-(CH_2)_r-$, $-CO-NR^2-(CH_2)_r-$, $-NR^2-(CH_2)_r-$, $-O-(CH_2)_r-CO-O-$, $-O-(CH_2)_r-O-CO-$, $-O-(CH_2)_r-CO-NR^2-$, $-O-(CH_2)_r-NR^2-$, $-O-(CH_2)_r-O-$, $-O-(CH_2)_r-NR^2-CO-$, $-NR^2-(CH_2)_r-CO-O-$, $-NR^2-(CH_2)_r-O-$, $-NR^2-(CH_2)_r-$, $-NR^2(CH_2)_r-NR^2-$, $-NR^2-(CH_2)_r-O-CO-$, $-CO-NR^2-(CH_2)_r-O-$, $-CO-NR^2-(CH_2)_r-NR^2-$, $-CO-NR^2-(CH_2)_r-O-CO-$, $-O-CO-(CH_2)_r-CO-$, $-O-CO-(CH_2)_r-O-$, $-O-CO-(CH_2)_r-NR^2-$, $-O-CO-(CH_2)_r-CO-O-$, $-O-CO-(CH_2)_r-CO-NR^2-$, $-O-CO-(CH_2)_r-NR^2-CO-$, $-(CH_2)_r-CO-(CH_2)_s-$, $-(CH_2)_r-CO-O-(CH_2)_s-$, $-(CH_2)_r-O-CO-(CH_2)_s-$, $-(CH_2)_r-NR^2-CO-(CH_2)_s-$, $-(CH_2)_r-NR^2-CO-O-(CH_2)_s-$, $-(CH_2)_r-O-(CH_2)_s-O-$, $-(CH_2)_r-CO-O-(CH_2)_s-O-$, $-(CH_2)_r-O-CO-(CH_2)_s-O-$, $-(CH_2)_r-NR^2-CO-(CH_2)_s-O-$, $-(CH_2)_r-NR^2-CO-O-(CH_2)_s-O-$, $-O-(CH_2)_r-O-(CH_2)_s-$, $-O-(CH_2)_r-CO-O-(CH_2)_s-$, $-O-(CH_2)_r-NR^2-CO-(CH_2)_s-$, $-O-(CH_2)_r-NR^2-CO-O-(CH_2)_s-$, $-O-(CH_2)_r-O-(CH_2)_s-O-$, $-O-(CH_2)_r-NR^2-CO-(CH_2)_s-O-$, $-NR^2-CO-(CH_2)_s-O-$, $-O-(CH_2)_r-NR^2-CO-O-(CH_2)_s-O-$, $-CO-O-(CH_2)_r-O-(CH_2)_s-$, $-CO-O-(CH_2)_r-O-(CH_2)_s-O-$, wherein r and s are each an integer from 1 to 20, but especially from 2 to 12, with the proviso that $r+s \leq 20$, especially $\leq 15$, and wherein $R^2$ represents hydrogen or lower alkyl.

Examples of preferred "spacer units" $S^1$ are 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 3-propyleneoxy, 3-propyleneoxycarbonyl, 2-ethylenecarbonyloxy, 4-butyleneoxy, 4-butyleneoxycarbonyl, 3-propylenecarbonyloxy, 5-pentyleneoxy, 5-pentyleneoxycarbonyl, 4-butylenecarbonyloxy, 6-hexyleneoxy, 6-hexyleneoxycarbonyl, 5-pentylenecarbonyloxy, 7-heptyleneoxy, 7-heptyleneoxycarbonyl, 6-hexylenecarbonyloxy, 8-octyleneoxy, 8-octyleneoxycarbonyl, 7-heptylenecarbonyloxy, 9-nonyleneoxy, 9-nonyleneoxycarbonyl, 8-octylenecarbonyloxy, 10-decyleneoxy, 10-decyleneoxycarbonyl, 9-nonylenecarbonyloxy, 11-undecyleneoxy, 11-undecyleneoxycarbonyl, 10-decylenecarbonyloxy, 12-dodecyleneoxy, 12-dodecyleneoxycarbonyl, 11-undecylenecarbonyloxy, 3-propyleneiminocarbonyl, 4-butyleneiminocarbonyl, 5-pentyleneiminocarbonyl, 6-hexyleneiminocarbonyl, 7-heptyleneirninocarbonyl, 8-octyleneiminocarbonyl, 9-nonyleneiminocarbonyl, 1 0-decyleneiminocarbonyl, 11-undecyleneiminocarbonyl, .12-dodecyleneiminocarbonyl, 2-ethylenecarbonylimino, 3-propylenecarbonylimino, 4-butylenecarbonylimino, 5-pentylenecarbonylimino, 6-hexylenecarbonylimino, 7-heptylenecarbonylimino, 8-octylenecarbonylimino, 9-nonylenecarbonylimino, 10-decylenecarbonylimino, 11-undecylenecarbonylimino, 6-(3-propyleneiminocarbonyloxy)hexylene, 6-(3-propyleneoxy)hexylene, 6-(3-propyleneoxy)hexyleneoxy, 6-(3-propyleneiminocarbonyloxy)hexyleneoxy, 6-(3-propyleneiminocarbonyl)hexylene, 6-(3-propyleneiminocarbonyl)hexyleneoxy, 1,2-ethylenedioxy, 1,3-propylenedioxy, 1,4-butylenedioxy, 1,5-pentylenedioxy, 1,6-hexylenedioxy, 1,7-heptylenedioxy, 1,8-octylenedioxy, 1,9-nonylenedioxy, 1,10-decylenedioxy, 1,11-undecylenedioxy, 1,12-dodecylenedioxy and the like.

Especially preferred "spacer units" $S^1$ are a straight-chain alkylene grouping represented by $-(CH_2)_r-$, and also $-(CH_2)_r-O-$, $-(CH_2)_r-CO-O-$, $-(CH_2)_r-O-CO-$, $-(CH_2)_r-CO-NH-$, $-(CH_2)_r-NH-CO-$, $-O-(CH_2)_r-$, $-CO-O-(CH_2)_r-$, $-CO-NH-(CH_2)_r-$, $-O-CO-(CH_2)_r-$, $-O-CO-(CH_2)_r-$, $-O-(CH_2)_r-O-CO-$, $-O-(CH_2)_r-$, $-CO-NH-$, $-O-(CH_2)_r-NH-CO-$, $-CO-O-(CH_2)_r-O-$, $-CO-NH-(CH_2)_r-O-$, $-O-(CH_2)_r-O-$, $-(CH_2)_r-NH-CO-(CH_2)_s-$, $-(CH_2)_r-NH-CO-O-(CH_2)_s-$, $-(CH_2)_r-O-(CH_2)_s-O-$, $-(CH_2)_r-NH-CO-(CH_2)_s-O-$, $-(CH_2)_r-NH-CO-O-(CH_2)_s-O-$, $-O-(CH_2)_r-NH-CO-(CH_2)_s-O-$, $-O-(CH_2)_r-NH-CO-O-(CH_2)_s-O-$, $-O-CO-(CH_2)_r-O-(CH_2)_s-O-$, $-CO-O-(CH_2)_r-O-(CH_2)_s-O-$, $-O-(CH_2)_r-NH-CO-(CH_2)_s-O-$, $-O-CO-(CH_2)_r-NH-CO-(CH_2)_s-O-$, wherein r and s are each an integer from 2 to 12 and the sum of $r+s \leq 15$.

Preferred "spacer units" $S^2$ in the context of the present invention are a straight-chain or branched alkylene grouping, represented by $-(CH_2)_r-$, and also $-(CH_2)_r-O-$, $-(CH_2)_r-CO-$, $-(CH_2)_r-CO-O-$, $-(CH_2)_r-O-CO-$, $-(CH_2)_r-CO-NR^2-$, $-(CH_2)_r-NR^2-CO-$, $-(CH_2)_r-O-(CH_2)_s-$, $-(CH_2)_r-CO-O-(CH_2)_s-$, $-(CH_2)_r-O-CO-(CH_2)_s-$, $-(CH_2)_r-NR^2-CO-(CH_2)_s-$, $-(CH_2)_r-NR^2-CO-O-(CH_2)_s-$, $-(CH_2)_r-O-(CH_2)_s-O-$, $-(CH_2)_r-CO-O-(CH_2)_s-O-$, $-(CH_2)_r-O-CO-(CH_2)_s-O-$, $-(CH_2)_r-NR^2-CO-O-(CH_2)_s-O-$, wherein r and s are each an integer from 1 to 20, but especially from 2 to 12, with the proviso that $r+s \leq 20$, especially $\leq 15$, and wherein $R^2$ represents hydrogen or lower alkyl.

Examples of preferred "spacer units" $S^2$ are 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 3-propyleneoxy, 3-propyleneoxycarbonyl, 2-ethylenecarbonyloxy, 4-butyleneoxy, 4-butyleneoxycarbonyl, 3-propylenecarbonyloxy, 5-pentyleneoxy, 5-pentyleneoxycarbonyl, 4-butylenecarbonyloxy, 6-hexyleneoxy, 6-hexyleneoxycarbonyl, 5-pentylenecarbonyloxy, 7-heptyleneoxy, 7-heptyleneoxycarbonyl, 6-hexylenecarbonyloxy, 8-octyleneoxy, 8-octyleneoxycarbonyl, 7-heptylenecarbonyloxy, 9-nonyleneoxy, 9-nonyleneoxycarbonyl, 8-octylenecarbonyloxy, 10-decyleneoxy, 10-decyleneoxycarbonyl, 9-nonylenecarbonyloxy, 11-undecyleneoxy, 11-undecyleneoxycarbonyl, 10-decylenecarbonyloxy, 12-dodecyleneoxy, 12-dodecyleneoxycarbonyl, 11-undecylenecarbonyloxy, 3-propyleneiminocarbonyl, 4-butyleneiminocarbonyl, 5-pentyleneiminocarbonyl, 6-hexyleneiminocarbonyl, 7-heptyleneiminocarbonyl, 8-octyleneiminocarbonyl, 9-nonyleneiminocarbonyl, 10-decyleneiminocarbonyl, 11-undecyleneiminocarbonyl, 12-dodecyleneiminocarbonyl, 2-ethylenecarbonylimino, 3-propylenecarbonylimino, 4-butylenecarbonylimino, 5-pentylenecarbonylimino, 6-hexylenecarbonylimino, 7-heptylenecarbonylimino, 8-octylenecarbonylimino, 9-nonylenecarbonylimino, 10-decylenecarbonylimino, 11-undecylenecarbonylimino, 6-(3-propyleneiminocarbonyloxy)hexylene, 6-(3-propyleneoxy)hexylene, 6-(3-propyleneoxy)hexyleneoxy, 6-(3-propyleneiminocarbonyloxy)hexyleneoxy, 6-(3-propyleneiminocarbonyl)hexylene, 6-(3-propyleneiminocarbonyl)hexyleneoxy and the like.

Especially preferred "spacer units" $S^2$ are a straight-chain alkylene grouping represented by —$(CH_2)_r$—, and also —$(CH_2)_r$—O—, —$(CH_2)_r$—NH—CO—$(CH_2)_s$—, —$(CH_2)_r$—NH—CO—O—$(CH_2)_s$—, —$(CH_2)_r$—O—$(CH_2)_s$—O—, —$(CH_2)_r$—NH—CO—$(CH_2)_s$—O—, —$(CH_2)_r$—NH—CO—O—$(CH_2)_s$—O—, —$(CH_2)_r$—CO—O—, —$(CH_2)_r$—O—CO—, —$(CH_2)_r$—CO—NH—, —$(CH_2)_r$—NH—CO—, wherein r and s are each an integer from 2 to 12 and the sum of r+s≦15.

The expression "unsubstituted or optionally fluoro-, chloro-, cyano-, alkyl- or alkoxy-substituted phenylene" includes in the context of the present invention 1,2-, 1,3-or 1,4-phenylene that is unsubstituted or mono- or poly-substituted by fluorine, chlorine, cyano, alkyl or alkoxy, preferably by fluorine, methyl, ethyl, propyl, butyl, methoxy, ethoxy, propoxy, butoxy or cyano. Preference is given to 1,3- or 1,4-phenylene, but especially to 1,4-phenylene.

Examples of preferred phenylene radicals are 1,3- or 1,4-phenylene, 4- or 5-methyl-1,3-phenylene, 4- or 5-methoxy-1,3-phenylene, 4- or 5-ethyl-1,3-phenylene, 4- or 5-ethoxy-1,3-phenylene, 2- or 3-methyl-1,4-phenylene, 2- or 3-ethyl-1,4-phenylene, 2- or 3-propyl-1,4-phenylene, 2- or 3-butyl-1,4-phenylene, 2- or 3-methoxy-1,4-phenylene, 2- or 3-ethoxy-1,4-phenylene, 2- or 3-propoxy-1,4-phenylene, 2- or 3-butoxy-1,4-phenylene, 2,3-, 2,6- or 3,5-dimethyl-1,4-phenylene, 2,6- or 3,5-dimethoxy-1,4-phenylene, 2- or 3-fluoro-1,4-phenylene, 2,3-, 2,6- or 3,5-difluoro-1,4-phenylene, 2- or 3-chloro-1,4-phenylene, 2,3-, 2,6- or 3,5-dichloro-1,4-phenylene, 2- or 3-cyano-1,4-phenylene and the like.

The preferred side-chains of the formula I can be further divided into:
a) side-chains of the formula I having three rings A, B and C;
b) side-chains of the formula I having two rings A and C or B and C;
c) side-chains of the formula I having the ring C.

Of those, the groups listed under b) and c) are especially preferred.

Also preferred are those side-chains of the formula I wherein X and Y represent hydrogen.

Preference is accordingly given to the side-chains of the formula II:

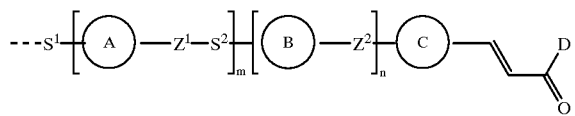

wherein A, B, C, D, $S^1$, $S^2$, $Z^1$, $Z^2$, m and n have the meanings given under formula I.

Special preference is given to the side-chains of formula II wherein $S^1$, $S^2$, m and n have the meanings given under formula I and wherein:

$Z^1$, $Z^2$ represent a single covalent bond, —$CH_2CH_2$—, —O—, —$CH_2$—O—, —O—$CH_2$—, —CO—CO—O— or —O—CO—;

A, B each independently of the other represents unsubstituted or optionally alkyl-, fluoroalkyl-, alkoxy- or fluoroalkoxy-substituted phenylene, pyridine-2,5-diyl, pyrimidine-2,5-diyl or cyclohexane-1,4-diyl;

C represents unsubstituted or optionally fluoro-, alkyl-, fluoroalkyl-, alkoxy- or fluoroalkoxy-substituted phenylene, pyridine-2,5-diyl, pyrimidine-2,5-diyl, 2,5-furanylene, or 1,4- or 1,6-naphthylene;

D represents —$OR^1$—, —$NR^1$—, or an oxygen atom linked to ring C in the ortho-position to form a coumarin unit, wherein $R^1$ is a straight-chain or branched alkyl group having from 1 to 12 carbon atoms or an optionally alkyl- or alkoxy-substituted cycloalkyl radical having 5 or 6 ring atoms.

Preferred monomer units from which the main chains of the side-chain polymers according to the invention are generally synthesised are the imide groups of the general formulae III, V and VII and/or the analogous amide acid groups and amide acid ester groups of the general formulae IV, VI and VIII:

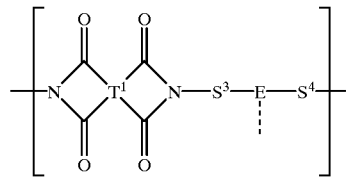

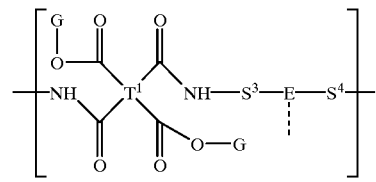

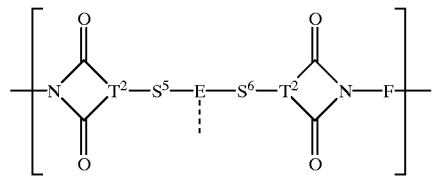

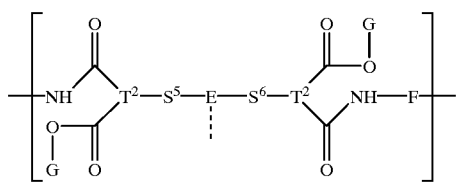

VI

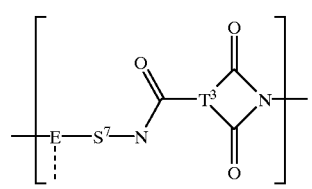

VII

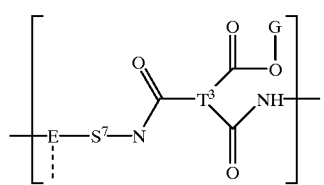

VIII in which the broken line symbolises, as appropriate, the linkage to one or two crosslinkable side-chains of the general formula I;

$T^1$ represents the tetravalent organic radical of a tetracarboxylic acid dianhydride after formal removal of the two —CO—O—CO— groups, the four valencies of which are distributed between four different carbon atoms of the radical;

$T^2$, $T^3$ each independently of the other represents an unsubstituted or optionally fluoro-, chloro-, cyano-, alkyl-, alkoxy-, fluoroalkyl- or fluoroalkoxy-substituted aromatic, aliphatic or alicyclic trivalent group, the three valencies of which are distributed between three different carbon atoms of the group;

$S^3$ represents a single covalent bond or a divalent group, such as straight-chain or branched alkylene groupings represented by —$(CH_2)_r$—, optionally mono- or poly-substituted by fluorine, chlorine or cyano, or a chain of the formula —$(CH_2)_r$—$L^1$— or —$(CH_2)_r$—$L^1$—$(CH_2)_s$—$L^2$—, wherein $L^1$ and $L^2$ represent a single bond or linking functional groups such as —O—, —CO—O—, —O—CO—, —$NR^2$—, —$NR^2$—CO—, —CO—$NR^2$—, —$NR^2$—CO—O—, —O—CO—$NR^2$—, —$NR^2$—CO—$NR^2$—, —CH=CH—, —C≡C—, —O—CO—O—, $R^2$ represents hydrogen or lower alkyl and r and s are each an integer from 1 to 20, with the proviso that $r+s \leq 24$;

$S^4$, $S^7$ each independently of the other represents a single covalent bond or divalent groups, such as straight-chain or branched alkylene groupings represented by —$(CH_2)_r$—, optionally mono- or poly-substituted by fluorine, chlorine or cyano, or chains of the formula —$L^1$—$(CH_2)_r$— or —$L^1$—$(CH_2)_r$—$L^2$—$(CH_2)_s$—, wherein $L^1$ and $L^2$ represent a single bond or linking functional groups such as —O—, —CO—O—, —O—CO—, —$NR^2$—, —$NR^2$—CO—, —CO—$NR^2$—, —$NR^2$—CO—O—, —O—CO—$NR^2$—, —$NR^2$—CO—$NR^2$—, —CH=CH—, —C≡C—, —O—CO—O—, $R^2$ represents hydrogen or lower alkyl and r and s are each an integer from 1 to 20, with the proviso that $r+s \leq 24$;

$S^5$, $S^6$ each independently of the other represents a single covalent bond or divalent groups, such as straight-chain or branched alkylene groupings represented by —$(CH_2)_r$—, optionally mono- or poly-substituted by fluorine, chlorine or cyano, or chains of the formula $L^1$—$(CH_2)_r$—$L^2$— or $L^1$—$(CH_2)_r$—$L^2$—$(CH_2)_s$—$L^3$—, wherein $L^1$, $L^2$ and $L^3$ each independently of the others represents a single bond or linking functional groups such as —O—, —CO—O—, —O—CO—, —$NR^2$—, —$NR^2$—CO—, —CO—$NR^2$—, —$NR^2$—CO—O—, —O—CO—$NR^2$—, —$NR^2$—CO—$NR^2$—, —CH=CH—, —C≡C—, —O—CO—O—; wherein $R^2$ represents hydrogen or lower alkyl and r and s are each an integer from 1 to 20, with the proviso that $1 \leq r+s \leq 24$;

E represents an unsubstituted or optionally fluoro-, chloro-, cyano-, alkyl-, alkoxy-, fluoroalkyl- or fluoroalkoxy-substituted aromatic or alicyclic divalent, trivalent or tetravalent group, the valencies of which are distributed between different atoms of the group, or is the nitrogen atom or —CH—;

F represents the radical of an aliphatic, alicyclic or aromatic diamine after formal removal of the two amino groups; and G represents hydrogen or a monovalent organic group, derived from an alcohol after formal removal of the hydroxy group.

The tetracarboxylic acid dianhydride on which the tetravalent organic radical $T^1$ is based may be aliphatic, alicyclic or aromatic.

Preferred examples of aliphatic or alicyclic tetracarboxylic acid anhydrides are: butanetetracarboxylic acid dianhydride; ethylenemaleic acid dianhydride; 1,2,3,4-cyclobutanetetracarboxylic acid dianhydride; 1,2,3,4-cyclopentanetetracarboxylic acid dianhydride; 2,3,5-tricarboxycyclopentylacetic acid dianhydride; 3,5,6-tricarboxynorbornylacetic acid dianhydride; 2,3,4,5-tetrahydrofurantetracarboxylic acid dianhydride; 4-(2,5-dioxotetrahydrofuaran-3-yl)tetrahydronaphthalene-1,2-dicarboxylic acid dianhydride; 5-(2,5-dioxotetrahydrofuran-3-yl)-3-methyl-3-cyclohexene-1,2-dicarboxylic acid dianhydride; bicyclo[2.2.2]oct-7-ene-2,3,5,6-tetracarboxylic acid dianhydride; bicyclo[2.2.2]octane-2,3,5,6-tetracarboxylic acid dianhydride; 1,8-dimethylbicyclo[2.2.2]oct-7-ene-2,3,5,6-tetracarboxylic acid dianhydride.

Examples of preferred aromatic tetracarboxylic acid dianhydrides are: pyromellitic acid dianhydride; 3,3',4,4'-benzophenonetetracarboxylic acid dianhydride; 4,4'-oxydiphthalic acid dianhydride; 3,3',4,4'-diphenylsulphonetetracarboxylic acid dianhydride; 1,4,5,8-naphthalenetetracarboxylic acid dianhydride; 2,3,6,7-naphthalenetetracarboxylic acid dianhydride; 3,3',4,4'-dimethyldiphenylsilanetetracarboxylic acid dianhydride; 3,3',4,4'-tetraphenylsilanetetracarboxylic acid dianhydride; 1,2,3,4-furantetracarboxylic acid dianhydride; 4,4'-bis(3,4-dicarboxyphenoxy)diphenyl sulphide dianhydride; 4,4'-bis(3,4-dicarboxyphenoxy)diphenyl sulphone dianhydride; 4,4'-bis(3,4-dicarboxyphenoxy)diphenylpropane dianhydride; 3,3',4,4'-biphenyltetracarboxylic acid dianhydride; ethylene glycol bis(trimellitic acid) dianhydride; 4,4'-(1,4-phenylene)bisphthalic acid) dianhydride; 4,4'-(1,3-phenylene)bis(phthalic acid) dianhydride; 4,4'-(hexafluoroisopropylidene)diphthalic acid dianhydride;

4,4'-oxydi(1,4-phenylene)bis(phthalic acid) dianhydride; and 4,4'-methylenedi(1,4-phenylene)bis(phthalic acid) dianhydride.

Especially preferred are:

1,2,3,4-cyclobutanetetracarboxylic acid dianhydride;

1,2,3,4-cyclopentanetetracarboxylic acid dianhydride;

2,3,5-tricarboxycyclopentylacetic acid dianhydride;

5-(2,5-dioxotetrahydrofuran-3-yl)-3-methyl-3-cyclohexene-1,2-dicarboxylic acid dianhydride;

4-(2,5-dioxotetrahydrofuran-3-yl)tetrahydronaphthalene-1,2-dicarboxylic acid dianhydride;

4,4'-(hexafluoroisopropylidene)diphthalic acid dianhydride; and bicyclo[2.2.2]oct-7-ene-2,3,5,6-tetracarboxylic acid dianhydride.

The groups $T^2$ and $T^3$ can be derived from aliphatic, alicyclic or aromatic dicarboxylic acid anhydrides.

Preferred groups $T^2$ and $T^3$ are trivalent aromatic or carbocyclic groups, the three valencies of which are so distributed between three different carbon atoms that two of those valencies are located at adjacent carbon atoms.

Especially preferred groups $T^2$ and $T^3$ are trivalent benzene derivatives, the three valencies of which are so distributed between three different carbon atoms that two of those valencies are in the ortho-position relative to one another.

Preferred "spacer units" $S^3$ in the context of the present invention are a straight-chain or branched alkylene grouping, represented by $-(CH_2)_r-$, and also $-(CH_2)_r-O-$, $-(CH_2)_r-CO-$, $-(CH_2)_r-CO-O-$, $-(CH_2)_r-O-CO-$, $-(CH_2)_r-CO-NR^2-$, $-(CH_2)_r-NR^2-CO-$, $-(CH_2)_r-NR^2-$, $-(CH_2)_r-O-(CH_2)_s-$, $-(CH_2)_r-CO-O-(CH_2)_s-$, $-(CH_2)_r-O-CO-(CH_2)_s-$, $-(CH_2)_r-NR^2-CO-(CH_2)_s-$, $-(CH_2)_r-NR^2-CO-O-(CH_2)_s-$, $-(CH_2)_r-O-(CH_2)_s-O-$, $-(CH_2)_r-CO-O-(CH_2)_s-O-$, $-(CH_2)_r-O-CO-(CH_2)_s-O-$, $-(CH_2)_r-NR^2-CO-(CH_2)_s-O-$, $-(CH_2)_r-NR^2-CO-O-(CH_2)_s-O-$, $-(CH_2)_r-O-(CH_2)_s-CO-O-$, $-(CH_2)_r-O-(CH_2)_s-O-CO-$, wherein r and s are each an integer from 1 to 20, but especially from 2 to 12, with the proviso that $r+s \leq 20$, especially $\leq 15$, and wherein $R^2$ represents hydrogen or lower alkyl.

Examples of preferred "spacer units" $S^3$ are 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 3-propyleneoxy, 3-propyleneoxycarbonyl, 2-ethylenecarbonyloxy, 4-butyleneoxy, 4-butyleneoxycarbonyl, 3-propylenecarbonyloxy, 5-pentyleneoxy, 5-pentyleneoxycarbonyl, 4-butylenecarbonyloxy, 6-hexyleneoxy, 6-hexyleneoxycarbonyl, 5-pentylenecarbonyloxy, 7-heptyleneoxy, 7-heptyleneoxycarbonyl, 6-hexylenecarbonyloxy, 8-octyleneoxy, 8-octyleneoxycarbonyl, 7-heptylenecarbonyloxy, 9-nonyleneoxy, 9-nonyleneoxycarbonyl, 8-octylenecarbonyloxy, 10-decyleneoxy, 10-decyleneoxycarbonyl, 9-nonylenecarbonyloxy, 11-undecyleneoxy, 11-undecyleneoxycarbonyl, 10-decylenecarbonyloxy, 12-dodecyleneoxy, 12-dodecyleneoxycarbonyl, 11-undecylenecarbonyloxy, 3-propyleneiminocarbonyl, 4-butyleneiminocarbonyl, 5-pentyleneiminocarbonyl, 6-hexyleneiminocarbonyl, 7-heptyleneiminocarbonyl, 8-octyleneiminocarbonyl, 9-nonyleneiminocarbonyl, 10-decyleneiminocarbonyl, 11-undecyleneiminocarbonyl, 12-dodecyleneiminocarbonyl, 2-ethylenecarbonylimino, 3-propylenecarbonylimino, 4-butylenecarbonylimino, 5-pentylenecarbonylimino, 6-hexylenecarbonylimino, 7-heptylenecarbonylimino, 8-octylenecarbonylimino, 9-nonylenecarbonylimino, 10-decylenecarbonylimino, 11-undecylenecarbonylimino, 6-(3-propyleneiminocarbonyloxy)hexylene, 6-(3-propyleneoxy)hexylene, 6-(3-propyleneoxy)hexyleneoxy, 6-(3-propyleneiminocarbonyloxy)hexyleneoxy, 6-(3-propyleneiminocarbonyl)hexylene, 6-(3-propyleneiminocarbonyl)hexyleneoxy and the like.

Preferred "spacer units" $S^4$ and $S^7$ in the context of the present invention are a straight-chain or branched alkylene grouping, represented by $-(CH_2)_r-$, and also $-O-(CH_2)_r-$, $-CO-(CH_2)_r-$, $-CO-O-(CH_2)_r-$, $-O-CO-(CH_2)_r-$, $-NR^2-CO-(CH_2)_r-$, $-NR^2-(CH_2)_r-$, $-CO-NR^2-(CH_2)_r-$, $-NR^2-CO-(CH_2)_r-$, $-O-(CH_2)_r-(CH_2)_s-$, $-(CH_2)_r-CO-O-(CH_2)_s-$, $-(CH_2)_r-O-CO-(CH_2)_s-$, $-(CH_2)_r-NR^2-CO-(CH_2)_s-$, $-(CH_2)_r-NR^2-CO-O-(CH_2)_s-O-$, $-(CH_2)_r-O-(CH_2)_s-$, $-O-(CH_2)_r-CO-O-(CH_2)_s-$, $-(CH_2)_r-O-CO-(CH_2)_s-$, $-O-(CH_2)_r-O-CO-(CH_2)_s-$, $-(CH_2)_r-NR^2-CO-(CH_2)_s-$, $-O-(CH_2)_r-NR^2-CO-O-(CH_2)_s-$, $-O-CO-(CH_2)_r-O-(CH_2)_s-$, $-CO-O-(CH_2)_r-O-(CH_2)_s-$, wherein r and s are each an integer from 1 to 20, but especially from 2 to 12, with the proviso that $r+s \leq 20$, especially $\leq 15$, and wherein $R^2$ represents hydrogen or lower alkyl.

Examples of preferred "spacer units" $S^4$ and $S^7$ are 1,2-ethylene, 1,3-propylene, 4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 2-oxyethylene, 3-oxypropylene, 4-oxybutylene, 5-oxypentylene, 6-oxyhexylene, 7-oxyheptylene, 8-oxyoctylene, 9-oxynonylene, 10-oxydecylene, 11-oxyundecylene, 12-oxydodecylene, 2-(oxycarbonyl)ethylene, 3-(oxycarbonyl)propylene, 4-(oxycarbonyl)butylene, 5-(oxycarbonyl)pentylene, 6-(oxycarbonyl)hexylene, 7-(oxycarbonyl)heptylene, 8-(oxycarbonyl)octylene, 9-(oxycarbonyl)nonylene, 10-(oxycarbonyl)decylene, 11-(oxycarbonyl)undecylene, 12-(oxycarbonyl)dodecylene, 2-(carbonyloxy)ethylene, 3-(carbonyloxy)propylene, 4-(carbonyloxy)butylene, 5-(carbonyloxy)pentylene, 6-(carbonyloxy)hexylene, 7-(carbonyloxy)heptylene, 8-(carbonyloxy)octylene, 9-(carbonyloxy)nonylene, 10-(carbonyloxy)decylene, 11-(carbonyloxy)undecylene, 12-(carbonyloxy)dodecylene, 2-(carbonylimino)ethylene, 3-(carbonylimino)propylene, 4-(carbonylimino)butylene, 5-(carbonylimino)pentylene, 6-(carbonylimino)hexylene, 7-(carbonylimino)heptylene, 8-(carbonylimino)octylene, 9-(carbonylimino)nonylene, 10-(carbonylimino)decylene, 11-(carbonylimino)undecylene, 12-(carbonylimino)dodecylene, 2-iminoethylene, 3-iminopropylene, 4-iminobutylene, 5-iminopentylene, 6-iminohexylene, 7-iminoheptylene, 8-iminooctylene, 9-iminononylene, 10-iminodecylene, 11-iminoundecylene, 12-iminododecylene, 2-iminocarbonylethylene, 3-iminocarbonylpropylene, 4-iminocarbonylbutylene, 5-iminocarbonylpentylene, 6-iminocarbonylhexylene, 7-iminocarbonylheptylene, 8-iminocarbonyloctylene, 9-iminocarbonylnonylene, 10-iminocarbonyldecylene, 11-iminocarbonylundecylene, 12-iminocarbonyldodecylene, 2-(2-ethyleneoxy)ethylene, 2-(3-propyleneoxy)ethylene, 6-(4-butyleneoxy)hexylene, 2-(2-ethyleneiminocarbonyl)ethylene, 2-(3-propyleneiminocarbonyl)ethylene, 6-(4-butyleneiminocarbonyl)hexylene, 6-(3-propyleneiminocarbonyloxy)hexylene, 6-(3-propyleneiminocarbonyl)hexylene and the like.

Preferred "spacer units" $S^5$ and $S^6$ in the context of the present invention are a straight-chain or branched alkylene grouping, represented by —$(CH_2)_r$—, and also —$(CH_2)_r$—O—, —$(CH_2)_r$—CO—, —$(CH_2)_r$—CO—O—, —$(CH_2)_r$—O—CO—, —$(CH_2)_r$—CO—NR²—, —$(CH_2)_r$—NR²—CO—, —$(CH_2)_r$—NR²—, —O—$(CH_2)_r$—, —CO—O—$(CH_2)_r$—, —O—CO—$(CH_2)_r$—, —NR²—CO—$(CH_2)_r$—, —CO—NR²—$(CH_2)_r$—, —NR²—$(CH_2)_r$—, —O—$(CH_2)_r$—CO—O—, —O—$(CH_2)_r$—O—CO—, —O—$(CH_2)_r$—CO—NR²—, —O—$(CH_2)_r$—NR²—, —O—$(CH_2)_r$—O—, —O—$(CH_2)_r$—NR²—CO—, —NR²—$(CH_2)_r$—CO—O—, —NR²—$(CH_2)_r$—O—, —NR²—$(CH_2)_r$—NR²—, —NR²—$(CH_2)_r$—O—CO—, —CO—NR²—$(CH_2)_r$—O—, —CO—NR²—$(CH_2)_r$—NR²—, —CO—NR²—$(CH_2)_r$—O—CO—, —O—CO—$(CH_2)_r$—CO—, —O—CO—$(CH_2)_r$—O—, —CO—$(CH_2)_r$—NR²—, —O—CO—$(CH_2)_r$—CO—O—, —O—CO—$(CH_2)_r$—CO—NR²—, —O—CO—$(CH_2)_r$—NR²—CO—, —$(CH_2)_r$—O—$(CH_2)_s$—, —$(CH_2)_r$—CO—O—$(CH_2)_s$—, —$(CH_2)_r$—O—CO—$(CH_2)_s$—, —$(CH_2)_r$—NR²—CO—$(CH_2)_s$—O—$(CH_2)_r$—NR²—CO—O—$(CH_2)_s$—, —$(CH_2)_r$—O—$(CH_2)_s$—O—, —$(CH_2)_r$—CO—O—$(CH_2)_s$—O—, —$(CH_2)_r$—O—CO—$(CH_2)_s$—O—, —$(CH_2)_r$—NR²—CO—$(CH_2)_s$—O—, —$(CH_2)_r$—NR²—CO—O—$(CH_2)_s$—O—, —O—$(CH_2)_r$—O—$(CH_2)_s$—, —O—$(CH_2)_r$—CO—O—$(CH_2)_s$—, —O—$(CH_2)_r$—NR²—CO—$(CH_2)_s$—, —O—$(CH_2)_r$—NR²—CO—O—$(CH_2)_s$—, —O—$(CH_2)_r$—CO—O—$(CH_2)_s$—O—$(CH_2)_r$—O—$(CH_2)_s$—O—, —O—$(CH_2)_r$—NR²—CO—$(CH_2)_s$—O—, —O—$(CH_2)_r$—NR²—CO—O—$(CH_2)_s$—O—, —CO—O—$(CH_2)_r$—O—$(CH_2)_s$—O—, —CO—O—$(CH_2)_r$—O—$(CH_2)_s$—, —CO—O$(CH_2)_r$—O—$(CH_2)_s$—O—, wherein r and s are each an integer from 1 to 20, but especially from 2 to 12, with the proviso that $r+s \leq 20$, especially $\leq 15$, and wherein $R^2$ represents hydrogen or lower alkyl.

Examples of preferred "spacer units" $S^5$ and $S^6$ are 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 3-propyleneoxy, 3-propylenreoxycarbonyl, 2-ethylenecarbonyloxy, 4-butyleneoxy, 4-butyleneoxycarbonyl, 3-propylenecarbonyloxy, 5-pentyleneoxy, 5-pentyleneoxycarbonyl, 4-butylenecarbonyloxy, 6-hexyleneoxy, 6-hexyleneoxycarbonyl, 5-pentylenecarbonyloxy, 7-heptyleneoxy, 7-heptyleneoxycarbonyl, 6-hexylenecarbonyloxy, 8-octyleneoxy, 8-octyleneoxycarbonyl, 7-heptylenecarbonyloxy, 9-nonyleneoxy, 9-nonyleneoxycarbonyl, 8-octylenecarbonyloxy, 10-decyleneoxy, 10-decyleneoxycarbonyl, 9-nonylenecarbonyloxy, 11-undecyleneoxy, 11-undecyleneoxycarbonyl, 10-decylenecarbonyloxy, 12-dodecyleneoxy, 12-dodecyleneoxycarbonyl, 12-undecylenecarbonyloxy, 3-propyleneiminocarbonyl, 4-butyleneiminocarbonyl, 5-pentyleneiminocarbonyl, 6-hexyleneiminocarbonyl, 7-heptyleneiminocarbonyl, 8-octyleneiminocarbonyl, 9-nonyleneiminocarbonyl, 10-decyleneiminocarbonyl, 11-undecyleneiminocarbonyl, 12-dodecyleneiminocarbonyl, 2-ethylenecarbonylimino, 3-propylenecarbonylimino, 4-butylenecarbonylimino, 5-pentylenecarbonylimino, 6-hexylenecarbonylimino, 7-heptylenecarbonylimino, 8-octylenecarbonylimino, 9-nonylenecarbonylimino, 10-decylenecarbonylimino, 11-undecylenecarbonylimino, 6-(3-propyleneiminocarbonyloxy)hexylene, 6-(3-propyleneoxy) hexylene, 6-(3-propyleneoxy)hexyleneoxy, 6-(3-propyleneiminocarbonyloxy)hexyleneoxy, 6-(3-propyleneiminocarbonyl)hexyl, 6-(3-propyleneiminocarbonyl)hexyloxy, 1,2-ethylenedioxy, 1,3-propylenedioxy, 1,4-butylenedioxy, 1,5-pentylenedioxy, 1,6-hexylenedioxy, 1,7-heptylenedioxy, 1,8-octylenedioxy, 1,9-nonylenedioxy, 1,10-decylenedioxy, 1,11-undecylenedioxy, 1,12-dodecylenedioxy and the like.

The radicals F are divalent groups that can be derived from aliphatic, alicyclic or aromatic diamines by formal removal of the amino groups.

Preferred examples of such aliphatic and alicyclic diamines are:
ethylenediamine, 1,3-propylenediamine, 1,4-butylenediamine, 1,5-pentylenediamine, 1,6-hexylenediamine, 1,7-heptylenediamine, 1,8-octylenediamine, 1,9-nonylenediamine, 1,10-decylenediamine, 1,11-undecylenediaminei 1,12-dodecylenediamine, α,α'-diamino-m-xylene, α,α'-diamino-p-xylene, (5-amino-2,2,4-trimethylcyclopentyl) methylamine, 1,2-diaminocyclohexane, 4,4'-diaminodicyclohexylmethane, 1,3-bis(methylamino) cyclohexane, 4,9-dioxadodecane-1,12-diamine.

Preferred examples of aromatic diamines are:
3,5-diaminobenzoic acid methyl ester; 3,5-diaminobenzoic acid hexyl ester; 3,5-diaminobenzoic acid dodecyl ester; 3,5-diaminobenzoic acid isopropyl ester; 4,4'-methylenedianiline; 4,4'-ethylenedianiline; 4,4'-diamino-3,3'-dimethyldiphenylmethane; 3,3',5,5'-tetramethylbenzidine; 4,4'-diaminodiphenyl sulphone; 4,4'-diaminodiphenyl ether; 1,5-diamninonaphthalene; 3,3'-dimethyl-4,4'-diaminobiphenyl; 3,4'-diaminodiphenyl ether; 3,3'-diaminobenzophenone; 4,4'-diaminobenzophenone; 4,4'-diamino-2,2'-dimethylbibenzyl; 2,2-bis[4-(4-aminophenoxy)phenyl] sulphone; 1,4-bis(4-arninophenoxy)benzene; 1,3-bis(4-aminophenoxy)benzene; 1,3-bis(3-aminophenoxy) benzene; 2,7-diarninofluorene; 9,9-bis(4-aminophenyl) fluorene; 4,4'-methylenebis(2-chloroaniline); 4,4-bis(4-aminophenoxy)biphenyl; 2,2',5,5'-tetrachloro-4,4'-diaminobiphenyl; 2,2'-dichloro-4,4'-diamino-5,5'-dimethoxybiphenyl; 3,3'-dimethoxy-4,4'-diaminobiphenyl; 4,4'-(1,4-phenyleneisopropylidene) bisaniline; 4,4'-(1,3-phenyleneisopropylidene)bisaniline; 2,2-bis[4-(4-aminophenoxy)phenyl]propane; 2,2-bis[3-(4-aminophenoxy)phenyl]hexafluoropropane; 2,2-bis[3-amino-4-methylphenyl]hexafluoropropane; 2,2-bis(4-aminophenyl)hexafluoropropane; 2,2'-bis[4-(4-amino-2-trifluoromethylphenoxy)phenyl]hexafluoropropane; 4,4'-diamino-2,2'-bis(trifluoromethyl)biphenyl; 4,4'-bis[(4-amino-2-trifluoromethyl)phenoxy]-2,3,5,6,2',3',5',6'-octafluorobiphenyl.

The divalent, trivalent or tetravalent group E serves essentially as a member linking the polymer main chain to the side-chain of the formula I, two of the valencies serving as the linkages, indicated in formulae III to VIII, to $S^3$ to $S^7$ within the main chain. The third and optionally the fourth valency serves as the linkage to one or two side-chain(s) of the formula I. The polymer chain may, however, also comprise building blocks of the formulae III to VIII in which the side-chain of formula I is absent, that is to say where the group E is merely divalent. The proportion of building blocks of the formulae III to VIII in which E is divalent, that is to say in which there is no crosslinkable side-chain of the formula I present, is generally less than 75%, but preferably less than 50% and more especially less than 30%. Of the trivalent and tetravalent groups E that contain one or two crosslinkable side-chains of the formula I, the trivalent groups, that is to say those groups which are linked to only one crosslinkable side-chain of the formula I, are preferred.

The building blocks of the formulae IV, VI and VIII are amidecarboxylic acid groupings or amidecarboxylic acid ester groupings which on the one hand may occur as a result of incomplete imidisation in the polyimide chain. On the other hand, polymers that consist only of building blocks of formulae IV, VI or VIII, that is to say polyamidecarboxylic acids or polyamidecarboxylic acid esters, are important precursors for the preparation of the polyimides according to the invention and are also included in the present invention. Of those polymers which contain groups of formulae IV, VI or VIII, preference is given to those in which G is hydrogen, that is to say those which consist exclusively of, or contain some, polyamidecarboxylic acid groups.

The side-chain polymers according to the invention can be present in the form of homopolymers as well as in the form of copolymers. The term "copolymers" is to be understood as meaning especially statistical copolymers.

The number of monomer building blocks from which the polymer chains according to the invention are synthesised can vary within a wide range. It is generally from 2 to 2000, but especially from 3 to 200.

The preparation of the polyamide acids and polyimides according to the invention is generally carried out analogously to the methods frequently described in the polyimide literature, for example *Plast. Eng.* 36, (1996).

For example, the polycondensation reaction for the preparation of the polyamide acids is carried out in solution in a polar aprotic organic solvent, such as γ-butyrolactone, N,N-dimethylacetamide, N-methylpyrrolidone or N,N-dimethylformamide. In most cases equimolar amounts of the dianhydride and the diamine are used, that is to say one amino group per anhydride group. If it is desired to stabilise the molecular weight of the polymer, it is possible for that purpose to add an excess or a less than stoichiometric amount of one of the two components or to add a monofunctional compound in the form of a dicarboxylic acid monoanhydride or in the form of a monoamine. Examples of such monofunctional compounds are maleic acid anhydride, phthalic acid anhydride, aniline and so on. The reaction is carried out preferably at a temperature of less than 100° C.

The cyclisation of the polyamide acids to form the polyimides can be carried out by heating, that is to say by condensation with removal of water or by other imidisation reactions with reagents. When carried out purely thermally, the imidisation of the polyamide acids is not always complete, that is to say the resulting polyimides may still contain proportions of polyamide acid. The imidisation reactions are generally carried out at a temperature of from 60 to 250° C., but preferably at less than 200° C. In order to achieve imidisation at rather lower temperatures there are additionally mixed into the reaction mixture reagents that facilitate the removal of water. Such reagents are, for example, mixtures consisting of acid anhydrides, such as acetic acid anhydride, propionic acid anhydride, phthalic acid anhydride, trifluoroacetic acid anhydride, and tertiary amines, such as triethylamine, trimethylamine, tributylamine, pyridine, N,N-dimethylaniline, lutidine, collidine etc. The amount of reagents used in that case is preferably at least two equivalents of amine and four equivalents of acid anhydride per equivalent of polyamide acid to be condensed.

The imidisation reaction can be carried out before or alternatively only after application to a support. The latter variant is preferred especially when the polyimide in question has poor solubility in the customary solvents.

The polymers according to the invention can then be applied to a support and, after any imidisation step which may be necessary, crosslinked by irradiation with linearly polarised light, that is to say by cycloaddition of their side-chains containing the photoreactive 3-arylacryloyl group, there being obtained, depending upon the direction of polarisation of the light radiated in, a preferred direction of orientation and of the angle of tilt for liquid crystals that are bought into contact with the orientation layer. By spatially selective irradiation of the molecular units according to the invention it is hence possible for very specific regions of a surface to be aligned and provided with a defined angle of tilt. At the same time the orientation layer so produced is also stabilised by the cycloaddition.

The present invention therefore relates also to the use of the polymers according to the invention as orientation layers for liquid crystals, and to their use in optical constructional elements, especially in the production of hybrid layer elements.

Such orientation layers can be produced, for example, by first preparing a solution of the resulting polymer material, which is applied to a support, which is optionally coated with an electrode (for example a glass plate coated with indium-tin oxide (ITO)), in a spin-coating apparatus, so that homogeneous layers of 0.05 to 50 μm thickness are produced. Then, or optionally after prior imidisation, the regions to be oriented can be irradiated, for example, with a high-pressure mercury vapour lamp, a xenon lamp or a pulsed UV laser, using a polariser and optionally a mask for creating images of structures. The irradiation time is dependent upon the output of the individual lamps and can vary from a few seconds to several hours. The dimerisation can also be carried out, however, by irradiation of the homogeneous layer using filters that for example, allow only the radiation suitable for the crosslinking reaction to pass through.

The polyimides and polyamidecarboxylic acids according to the invention are illustrated further by the following Examples.

EXAMPLE 1

0.38 g (1.81 mmol) of cis,cis,cis,cis-1,2,3,4-cyclopentanetetracarboxylic acid dianhydride was added to a solution of 0.800 g (1.81 mmol) of 3,5-diaminobenzoic acid 6-[2-methoxy-4-(2-methoxycarbonylvinyl)phenoxy] hexyl ester in 7 ml of gamma-butyrolactone. Stirring was then carried out at room temperature for 7 hours and the reaction solution was subsequently poured at room temperature, with vigorous stirring, into 800 ml of water. The precipitated polymer was filtered off and dried at 60° C. under a water-jet vacuum, resulting in 1.04 g of polyamide acid A in the form of a beige powder.

Two drops of 3 N sulphuric acid were added to a suspension of 0.3 g of polyamide acid A in 10 ml of toluene and the mixture was then heated at reflux, with water separation, for 48 hours. The reaction mixture was then completely concentrated by evaporation and the residue was digested in 10 ml of water for 1 hour. The solid was then filtered off and dried overnight at 80° C. under a water-jet vacuum, resulting in 285 mg of polyimide A having a glass transition temperature Tg=129 ° C.

The 3,5-diaminobenzoic acid 6-[2-methoxy-4-(2-methoxycarbonylvinyl)phenoxy]hexyl ester used as starting material was prepared in accordance with the following procedure:

(E)-4-Hydroxy-3-methoxycinnamic acid methyl ester

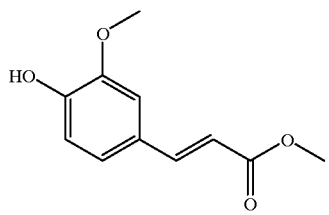

25 g (0.13 mol) of (E)-4-hydroxy-3-methoxycinnamic acid were dissolved in 180 ml of methanol, and 5 ml of concentrated sulphuric acid were added. The solution was heated under reflux for 2 hours. The main amount of the methanol (about 150 ml) was then distilled off and the residue that remained was poured into 500 ml of ice-water. The precipitated ester was filtered off with suction, washed in succession with cold water, with a small amount of a cold saturated sodium bicarbonate solution and again with cold water and dried at 50° C. under a waterjet vacuum. Chromatography on 250 g of silica gel using dichloromethane/diethyl ether (19:1) yielded 21.78 g of (E)-4-hydroxy-3-methoxycinnamic acid methyl ester in the form of a light-yellow oil.

(E)-4-(6-Hydroxyhexyloxy)-3-methoxycinnamic acid methyl ester

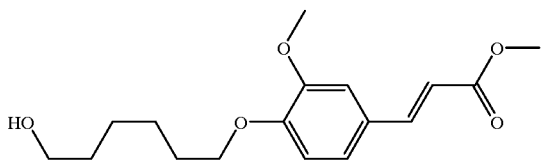

3.92 ml (25.2 mmol) of 1,6-hexanediol vinyl ether were added to a solution of 5.0 g (24.0 mmol) of (E)-4-hydroxy-3-methoxycinnamic acid methyl ester and 6.61 g (25.2 mmol) of triphenylphosphine in 150 ml of tetrahydrofuran. The colourless solution was subsequently cooled to 0° C. and then 11.5 ml (25.3 mmol) of a 40% solution of azodicarboxylic acid diethyl ester in toluene were added dropwise thereto in the course of 30 minutes. The mixture was subsequently allowed to react first for 30 minutes at 0° C. and then for 22.5 hours at room temperature. 150 ml of methanol and 10 drops of concentrated sulphuric acid were then added to the reaction solution and the mixture was stirred for 1.5 hours. The reaction mixture was then partitioned between ethyl acetate and water; the organic phase was washed with a saturated sodium bicarbonate solution and repeatedly with saturated sodium chloride solution, dried over magnesium sulphate, filtered and concentrated by evaporation. Chromatography of the residue on 470 g of silica gel using toluene/ethyl acetate 1:1 and subsequent crystallisation from ethyl acetate/hexane 3:5 yielded 6.13 g of 4-(6-hydroxyhexyloxy)-3-methoxycinnamic acid methyl ester.

3,5-Dinitrobenzoic acid 6-[2-methoxy-4-(2-methoxycarbonylvinyl)phenoxy]hexyl ester

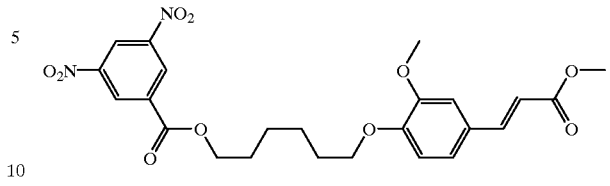

2.50 g (8.11 mmol) of 4-(6-hydroxyhexyloxy)-3-methoxycinnamic acid methyl ester, 1.96 g (8.51 mmol) of 3,5-dinitrobenzoyl chloride and 10 mg (0.08 mmol) of dimethylaminopyridine were dissolved in 25 ml of methylene chloride. 3.3 ml (40.5 mmol) of pyridine were added dropwise, in the course of 20 minutes at 0° C., to the resulting clear solution. After 2 hours at 0° C. the reaction mixture was partitioned between methylene chloride and water; the organic phase was washed with a saturated sodium bicarbonate solution and repeatedly with water. The organic phase was then dried over magnesium sulphate, filtered and concentrated by evaporation. Chromatography of the residue on 150 g of silica gel using toluene/ethyl acetate 9:1 yielded 3.6 g of 3,5-dinitrobenzoic acid 6-[2-methoxy-4-(2-methoxycarbonylvinyl)phenoxy]hexyl ester.

3,5-Diaminobenzoic acid 6-12-methoxy-4-(2-methoxycarbonylvinyl)phenoxy]hexyl ester

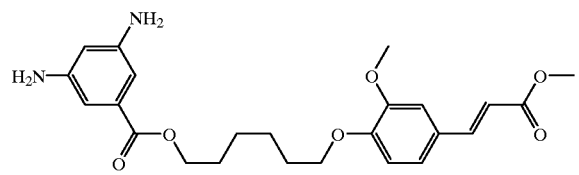

1.0 g (1.99 mmol) of 3,5-dinitrobenzoic acid 6-[2-methoxy-4-(2-methoxycarbonylvinyl)phenoxy]hexyl ester and 0.42 g (7.96 mmol) of ammonium chloride were suspended in 20 ml of a mixture consisting of methanol : water 9:1. 2.6 g (39.8 mmol) of zinc were then added in portions in the course of 30 minutes. After 2 hours at room temperature 20 ml of methanol were added. After a further 17 hours the reaction suspension was partitioned between methylene chloride and water and the organic phase was washed with a saturated sodium bicarbonate solution and repeatedly with water. The organic phase was then dried over magnesium sulphate, filtered and concentrated by evaporation. Chromatography of the residue on 150 g of silica gel using ethyl acetate yielded 0.84 g of 3,5-diaminobenzoic acid 6-[2-methoxy-4-(2-methoxycarbonylvinyl)phenoxy]hexyl ester.

EXAMPLE 2

Preparation was carried out analogously to Example 1 using 0.650 g (1.467 mmol) of 3,5-diaminobenzoic acid 6-[2-methoxy-4-(2-methoxycarbonylvinyl)phenoxy]hexyl ester and 0.320 g (1.476 mmol) of pyromellitic acid, yielding 833 mg of polyamide acid B.

Polyamide acid B was imidised for 1 hour by heating at 250° C., yielding polyimide B.

EXAMPLE 3

Preparation was carried out analogously to Example 1 using 0.650 g (1.467 mmol) of 3,5-diaminobenzoic acid 6-[2-methoxy-4-(2-methoxycarbonylvinyl)phenoxy]hexyl ester and 0.336 g (1.354 mmol) of bicyclo[2.2.2]oct-7-ene-2,3,5,6-tetracarboxylic acid dianhydride, yielding 855 mg of polyamide acid C.

Polyamide acid C was imidised for 1 hour by heating at 250° C., yielding polyimide C having a glass transition temperature Tg=118 ° C.

EXAMPLE 4

Preparation was carried out analogously to Example 1 using 0.677 g (1.530 mmol) of 3,5-diaminobenzoic acid 6-[2-methoxy-4-(2-methoxycarbonylvinyl)phenoxy]hexyl ester and 0.680 g (1.530 mmol) of 4,4'-(hexafluoroisopropylidene)diphthalic acid anhydride, yielding 1.20 g of polyamide acid D.

A mixture of 0.53 ml (3.80 mmol) of triethylamine and 0.73 ml (7.72 mmol) of acetic anhydride was added dropwise, in the course of 15 minutes at 0° C., to a solution of 850 mg of polyamide acid D in 2.9 ml of 1-methyl-2-pyrrolidone and the mixture was then stirred at room temperature for 24 hours. The reaction solution was then precipitated in 800 ml of methanol while stirring vigorously at room temperature. The precipitated polymer was filtered off and dried under a high vacuum, yielding 670 mg of polyimide D. Tg=149° C.

EXAMPLE 5

Production of an Orientation Layer

A 3% solution of polyamide acid A in γ-butyrolactone was filtered over a 0.2 μm Teflon filter and applied to a glass plate, which had been coated with indium-tin oxide (ITO), in a spin-coating apparatus at 2000 rev./min. in the course of 60 seconds. The resulting film was then predried for 15 minutes at 130° C. and then imidised for 1 hour at 200° C. to form the polyimide.

The glass plate so coated was then irradiated for 3 minutes with the linearly polarised UV light of a 200 W high-pressure mercury vapour lamp. A liquid-crystalline mixture of diacrylates was then applied by spin-coating to the irradiated layer and was then crosslinked by isotropic UV light for 30 minutes. Under a polarisation microscope, a uniaxially double-refractive layer of oriented liquid crystal molecules was observed. Using a tilt compensator it was ascertained that the direction of orientation agreed with the direction of polarisation of the UV light established when the polyimide layer was irradiated.

EXAMPLE 6

Production of an Orientation Layer Having a Defined Angle of Tilt

Two glass plates coated in accordance with Example 5 were irradiated for 3 minutes with linearly polarised UV light, the direction of incidence of the light being inclined by 70° relative to the plate normal. The direction of polarisation of the light lay in the plane defined by the direction of incidence of the light and the plate normal. The two plates were then so assembled, irradiated sides inwards to form a liquid crystal cell having a plate spacing of 20 μm, that the directions set by polarisation and light incidence when the plates were irradiated were parallel to one another. The cell was then filled with liquid crystal mixture 7728 from ROLIC AG in the isotropic state at a temperature of 105° C. The cell was then gradually cooled to room temperature at a rate of 1° C./min.. Between crossed polarisers a uniformly oriented liquid crystal layer was observed. The angle of tilt of this parallel cell, measured with the aid of the crystal rotation method, was 8.7°.

EXAMPLE 7

Determination of the Holding Ratio (HR)

Two glass plates coated in accordance with Example 5 were irradiated perpendicularly for 3 minutes with linearly polarised UV light. The two plates were then so assembled, irradiated sides inwards to form a liquid crystal cell having a plate spacing of 10 μm, that the directions set by polarisation and light incidence when the plates were irradiated were parallel to one another. The cell thus produced was then maintained at 120° C. under high vacuum for 14 hours. The cell was then filled with TFT liquid crystal mixture 8988 from ROLIC AG in vacuo at room temperature. Between crossed polarisers a uniformly oriented liquid crystal layer was observed. Prior to testing the holding ratio (HR) the cell so produced was first subjected to ageing for 50 hours at 120° C. The voltage decay V (at t=T=20 ms) of a voltage surge of 64 μs with $V_0$(V at t=0)=0.2 V was then measured over a period of T=20 ms. The holding ratio then determined, given by HR=$V_{rms}$(t=T)/$V_0$, was 98% at room temperature and 88.2% at 80° C.

What is claimed is:

1. A polyimide side-chain polymer, polyamide acid side-chain polymer, or polyamide acid ester side-chain polymer, which comprises as a side chain a photocrosslinkable group of the general formula I:

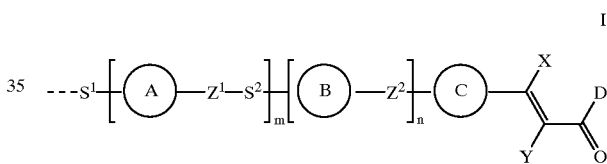

wherein the broken line indicates the point of linkage to the polymer main chain and wherein A, B each independently of the other represents unsubstituted or optionally fluoro-,chloro-, cyano-, alkyl-, alkoxy-, fluoroalkyl- or fluoroalkoxy-substituted phenylene, pyridine-2,5-diyl, pyrimidine-2,5-diyl, cyclohexane-1,4-diyl, piperidine-1,4-diyl, or piperazine-1,4-diyl;

C represents unsubstituted or optionally fluoro-, chloro-, cyano-, alkyl, alkoxy-, fluoroalkyl- or fluoroalkoxy-substituted phenylene, or pyrimidine-2,5-diyl, pyridine-2,5-diyl, 2,5-thiophenylene, 2,5-furanylene, 1,4- or 2,6-naphthylene;

D represents —$OR^1$, —$NR^1R^4$, or an oxygen atom linked to ring C in the ortho-position to form a coumarin unit, wherein $R^1$ is an optionally fluoro- or chloro-substituted straight-chain or branched alkyl group having from 1 to 20 carbon atoms or an optionally fluoro-, chloro-, alkyl- or alkoxy-substituted cycloalkyl radical having from 3 to 8 ring atoms, and $R^4$ is hydrogen or, independently, a further $R^1$ group;

$S^1$ represents a spacer unit which is a straight-chain or branched alkylene grouping represented by —$(CH_2)_r$—, optionally mono- or poly-substituted by fluorine, chlorine or cyano, or a chain of the formula $L^1$—$(CH_2)_r$—$L^2$— or $L^1$—$(CH_2)_r$—$L^2$—$(CH_2)_s$—$L^3$—, wherein $L^1$, $L^2$ and $L^3$ each independently of the others represents a single bond or the linking functional group —O—, —CO—O—, —O—CO—, —NR²—, —NR²—CO—, —CO—NR²—, —NR²—CO—O—, —O—CO—NR²—, —NR²—CO—NR²—, —CH=CH—, —C≡C—, or —O—CO—O—, wherein R² represents hydrogen or lower alkyl and r and s are each an integer from 1 to 20, with the proviso that r+s≦24;

S² represents a single covalent bond or a spacer unit;

X, Y each independently of the other represents hydrogen, fluorine, chlorine, cyano, or optionally fluoro-substituted alkyl having from 1 to 12 carbon atoms in which one CH₂ group or two or more non-adjacent CH₂ groups are optionally replaced by one or more of —O—, —CO—O—, —O—CO— and —CH=CH—;

Z¹, Z² each independently of the other represents a single covalent bond, —(CH₂)ₜ—, —O—, —CO—, —CO—O—, —O—CO—, —NR³—, —CO—NR³—, —R³N—CO—, —(CH₂)ᵤ—O—, —O—(CH₂)ᵤ—, —(CH₂)ᵤ—NR³— or —NR³—(CH₂)ᵤ—; R₃ representing hydrogen or lower alkyl, and t representing an integer from 1 to 4 and u representing an integer from 1 to 3;

m represents 0 or 1; and n represents 0 or 1.

2. A side-chain polymer as claimed in claim 1, wherein S² represents a spacer unit which is a straight-chain or branched alkylene grouping represented by —(CH₂)ᵣ—, optionally mono- or poly-substituted by fluorine, chlorine, or cyano, or a chain of the formula —(CH₂)ᵣ—L¹— or —(CH₂)ᵣ—L¹—(CH₂)ₛ—L²—, wherein L¹ and L² each independently of the other represents a single bond or the linking functional group —O—, —CO—O—, —O—CO—, —NR²—, —NR²—CO—, —CO—NR²—, —NR²—CO—O—, —O—CO—NR²—, —NR²—CO—NR²—, —CH=CH—, —C≡C—, or —O—CO—O—, wherein R² represents hydrogen or lower alkyl and r and s are each an integer from 1 to 20, with the proviso that r+s≦24.

3. A side-chain polymer according to claim 1, wherein the sum of the symbols m and n in formula I is equal to 0 or 1.

4. A side-chain polymer according to claim 1, wherein the polymer is a homopolymer.

5. A side-chain polymer according to claim 1, wherein the polymer is a copolymer.

6. A side-chain polymer according to claim 1, wherein the monomer building blocks carrying a side-chain are each linked to only one side-chain.

7. A side-chain polymer according to claim 1, wherein the total number of monomer building blocks forming the polymer chain is from 2 to 2000.

8. A side-chain polymer according to claim 1, wherein the total number of monomer building blocks forming the polymer chain is from 3 to 200.

9. A side-chain polymer according to claim 1, wherein the main chain consists of identical or different groups selected from the general formulae III–VIII:

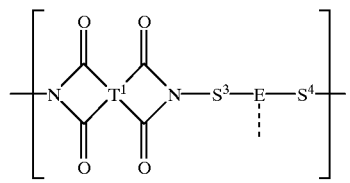

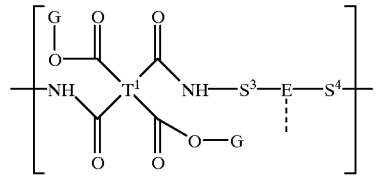

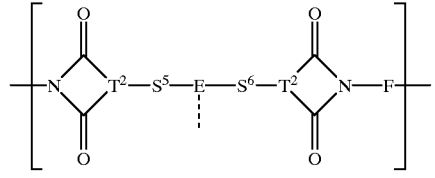

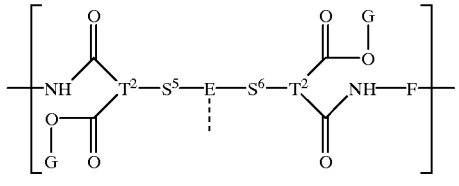

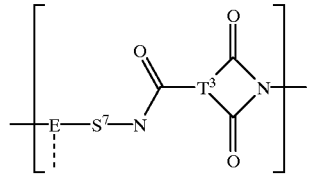

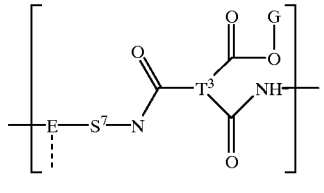

in which the broken line symbolises, as appropriate, the linkage to one or two crosslinkable side-chains of the general formula I;
wherein
T¹ represents the tetravalent organic radical of a tetracarboxylic acid dianhydride after formal removal of the two —CO—O—CO— groups, the four valencies of which are distributed between four different carbon atoms of the radical;

T², T³ each independently of the other represents an unsubstituted or optionally fluoro-, chloro-, cyano-, alkyl-, alkoxy-, fluoroalkyl- or fluoroalkoxy-substituted aromatic, aliphatic or alicyclic trivalent group, the three valencies of which are distributed between three different carbon atoms of the group;

S³ represents a single covalent bond or a divalent group;

S⁴, S⁷ each independently of the other represents a single covalent bond or a divalent group;

$S^5$, $S^6$ each independently of the other represents a single covalent bond or divalent group;

E represents an unsubstituted or optionally fluoro-, chloro-, cyano-, alkyl-, alkoxy-, fluoroalkyl- or fluoroalkoxy-substituted aromatic or alicyclic divalent, trivalent or tetravalent group, the valency of which is distributed between different atoms of the group, or E is a nitrogen atom or is —CH—;

F represents the radical of an aliphatic, alicyclic or aromatic diamine after formal removal of the two amino groups; and G represents hydrogen or a monovalent organic group, derived from an alcohol after formal removal of the hydroxy group.

10. A side-chain polymer according to claim 9, wherein G in formulae IV, VI and VIII is hydrogen.

11. A side-chain polymer as claimed in claim 9, wherein $S^3$ is a divalent group which is a straight-chain or branched alkylene grouping represented by —$(CH_2)_r$—, optionally mono- or poly-substituted by fluorine, chlorine or cyano, or a chain of the formula —$(CH_2)_r$—$L^1$— or —$(CH_2)_r$—$L^1$—$(CH_2)_s$—$L^2$—, wherein $L^1$ and $L^2$ represent a single bond or the linking functional group —O—, —CO—O—, —O—CO—, —$NR^2$—, —$NR^2$—CO—, —CO—$NR^2$—, —$NR^2$—CO—O—, —O—CO—$NR^2$—, —$NR^2$—CO—$NR^2$—, —CH=CH—, —C≡C—, or —O—CO—O—, $R^2$ represents hydrogen or lower alkyl and r and s are each an integer from 1 to 20, with the proviso that r+s≦24.

12. A side-chain polymer as claimed in claim 9, wherein at least one of $S^4$ and $S^7$ is a divalent group which is a straight-chain or branched alkylene grouping represented by —$(CH_2)_r$—, optionally mono- or poly-substituted by fluorine, chlorine or cyano, or a chain of the formula —$L^1$—$(CH_2)_r$— or —$L^1$—$(CH_2)_r$—$L^2$—$(CH_2)_s$—, wherein $L^1$ and $L^2$ represent a single bond or the linking functional group —O—, —CO—O—, —O—CO—, —$NR^2$—, —$NR^2$—CO—, —CO—$NR^2$—, —$NR^2$—CO—O—, —O—CO—$NR^2$—, —$NR^2$—CO—$NR^2$—, —CH=CH—, —C≡C—, or —O—CO—O—, $R^2$ represents hydrogen or lower alkyl and r and s are each an integer from 1 to 20, with the proviso that r+s≦24.

13. A side-chain polymer as claimed in claim 9, wherein at least one of $S^5$ and $S^6$ is a divalent group which is a straight-chain or branched alkylene grouping represented by —$(CH_2)_r$—, optionally mono- or poly-substituted by fluorine, chlorine or cyano, or a chain of the formula $L^1$—$(CH_2)_r$—$L^2$— or $L^1$—$(CH_2)_r$—$L^2$—$(CH_2)_s$—$L^3$—, wherein $L^1$, $L^2$ and $L^3$ each independently of the others represents a single bond or the linking functional group —O—, —CO—O—, —O—CO—, —$NR^2$—, —$NR^2$—CO—, —CO—$NR^2$—, —$NR^2$—CO—O—, —O—CO—$NR^2$—, —$NR^2$—CO—$NR^2$—, —CH=CH—, —C≡C—, or —O—CO—O—, wherein $R^2$ represents hydrogen or lower alkyl and r and s are each an integer from 1 to 20, with the proviso that 1≦r+s≦24.

14. A side chain polymer according to claim 1, wherein the side chain is a group of the formula II:

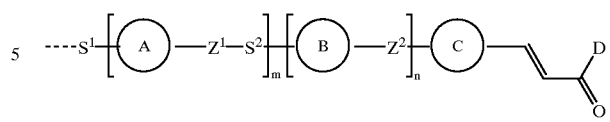

wherein $S^1$, $S^2$, m and n have the meanings given under formula I and wherein A, B each independently of the other represents unsubstituted or optionally alkyl-, fluoroalkyl-, alkoxy- or fluoroalkoxy-substituted phenylene, pyridine-2,5-diyl, pyrimidine-2,5-diyl or cyclohexane-1,4-diyl;

C represents unsubstituted or optionally fluoro-, alkyl-, fluoroalkyl-, alkoxy- or fluoroalkoxy-substituted phenylene, pyridine-2,5-diyl, pyrimidine-2,5-diyl, 2,5-furanylene, or 1,4- or 1,6-naphthylene;

D represents —$OR^1$, —$NR^1R^4$, or an oxygen atom linked to ring C in the ortho-position to form a coumarin unit, wherein $R^1$ is a straight-chain or branched alkyl group having from 1 to 12 carbon atoms or an optionally alkyl- or alkoxy-substituted cycloalkyl radical having 5 or 6 ring atoms, and $R^4$ is hydrogen or, independently, a further $R^1$ group; and $Z^{1,\ Z2}$ represents a single covalent bond, —$CH_2CH_2$—, —O—, —$CH_2$—O—, —O—$CH_2$—, —CO—O— or —O—CO—.

15. A side-chain polymer according to claim 14, wherein the sum of the symbols m and n in formula II is equal to 0 or 1.

16. An orientation layer, which comprises a support having applied thereto a layer of a side-chain polymer as claimed in claim 1 that has been crosslinked by irradiation with linearly polarized light.

17. An optical or electro-optical device, which comprises liquid crystal molecules and an orientation layer according to claim 16, wherein the liquid crystal molecules are oriented by the orientation layer.

18. A polyimide side-chain polymer, polyamide acid side-chain polymer, or polyamide acid ester side-chain polymer, which comprises as a side chain a photocrosslinkable group of the general formula I:

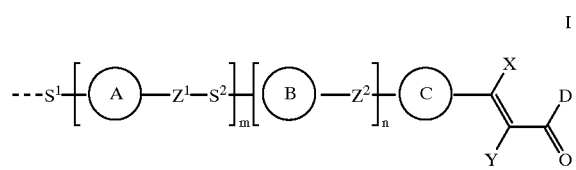

wherein the broken line indicates the point of linkage to the polymer main chain and wherein A, B each independently of the other represents unsubstituted or optionally fluoro-, chloro-, cyano-, alkyl-, alkoxy-, fluoroalkyl- or fluoroalkoxy-substituted phenylene, pyridine-2,5-diyl, pyrimidine-2,5-diyl, cyclohexane-1,4-diyl, piperidine-1,4-diyl, or piperazine-1,4-diyl;

C represents unsubstituted or optionally fluoro, chloro-, cyano-, alkyl-, alkoxy-, fluoroalkyl- or fluoroalkoxy-substituted phenylene, or pyrimidine-2,5-diyl, pyridine-2,5-diyl, 2,5-thiophenylene, 2,5-furanylene, 1,4- or 2,6-naphthylene;

D represents —$OR^1$, —$NR^1R^4$ or an oxygen atom linked to ring C in the ortho-position to form a coumarin unit, wherein $R^1$ is an optionally fluoro- or chloro-substituted straight-chain or branched alkyl group having from 1 to 20 carbon atoms or an optionally fluoro-, chloro-, alkyl- or alkoxy-substituted cycloalkyl radical having from 3 to 8 ring atoms, and $R^4$ is hydrogen or, independently, a further $R^1$ group;

$S^1$ represents a single covalent bond or a spacer unit;
$S^2$ represents a single covalent bond or a spacer unit;
X, Y each independently of the other represents hydrogen, fluorine, chlorine, cyano, or optionally fluoro-substituted alkyl having from 1 to 12 carbon atoms in which one $CH_2$ group or two or more non-adjacent $CH_2$ groups are optionally replaced by one or more of —O—, —CO—O—, —O—CO— and —CH=CH—;
$Z^1$, $Z^2$ each independently of the other represents a single covalent bond, —$(CH_2)_t$—, —O—, —CO—, —CO—O—, —O—CO—, —$NR^3$—, —CO—$NR^3$—, —$R^3$N—CO—, —$(CH_2)_u$—O—, —O—$(CH_2)_u$—, —$(CH_2)_u$—$NR^3$— or —$NR^3$—$(CH_2)_u$—; $R_3$ representing hydrogen or lower alkyl, and t representing an integer from 1 to 4 and u representing an integer from 1 to 3;
m represents 0 or 1; and
n represents 0 or 1,
wherein at least 50% of the monomer building blocks forming the main chain are linked to one or two side-chains of the general formula I.

19. A polyimide side-chain polymer, polyamide acid side-chain polymer, or polyamide acid ester side-chain polymer, which comprises as a side chain a photocrosslinkable group of the general formula I:

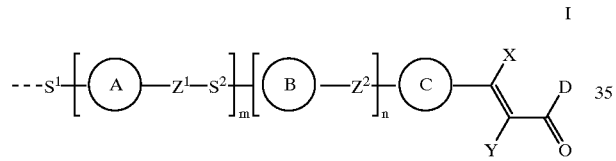

I wherein the broken line indicates the point of linkage to the polymer main chain and wherein
A, B each independently of the other represents unsubstituted or optionally fluoro-, chloro-, cyano-, alyl-, alkoxy-, fluoroalkyl- or fluoroalkoxy-substituted phenylene, pyridine-2,5-diyl, pyrimidine-2,5-diyl, cyclohexane-1,4-diyl, piperidine-1,4-diyl, or piperaine-1,4-diyl;
C represents unsubstituted or optionally fluoro-, chloro-, cyano-, alkyl-, alkoxy-, fluoroalkyl- or fluoroalkoxy-substituted phenylene, or pyrimidine-2,5-diyl, pyridine-2,5-diyl, 2,5-thiophenytene, 2,5-furanylene, 1,4- or 2,6-naphthylene;
D represents —$OR^1$, —$NR^1R^4$, or an oxygen atom linked to ring C in the ortho-position to form a coumarin unit, wherein $R^1$ is an optionally fluoro- or chloro-substituted straight-chain or branched alkyl group having from 1 to 20 carbon atoms or an optionally fluoro-, chloro-, alkyl- or alkoxy-sutbstituted cycloalkyl radical having from 3 to 8 ring atoms, and $R^4$ is hydrogen or, independently, a further $R^1$ group;
$S^1$ represents a single covalent bond or a spacer unit;
$S^2$ represents a single covalent bond or a spacer unit;
X, Y each independently of the other represents hydrogen, fluorine, chlorine, cyano, or optionally fluoro-substituted alkyl having from 1 to 12 carbon atoms in which one $CH_2$ group or two or more non-adjacent $CH_2$ groups are optionally replaced by one or more of —O—, —CO—O—, —O—CO— and —CH=CH—;

$Z^1$, $Z^2$ each independently of the other represents a single covalent bond, —$(CH_2)_t$—, —O—, —CO—, —CO—O—, —O—CO—, —$NR^3$—, —CO—$NR^3$—, —$R^3$N—CO—, —$(CH_2)_u$—O—, —O—$(CH_2)_u$—, —$(CH_2)_u$—$NR^3$— or —$NR^3$—$(CH_2)_u$—; $R_3$ representing hydrogen or lower alkyl, and t representing an integer from 1 to 4 and u representing an integer from 1 to 3;
m represents 0 or 1; and
n represents 0 or 1;
wherein at least 70% of the monomer building blocks forming the main chain are linked to one or two side-chains of the general formula I.

20. A polyimide side-chain polymer, polyamide acid side-chain polymer, or polyamide acid ester side-chain polymer, which comprises as a side chain a pholocrosslinkable group of the general formula l:

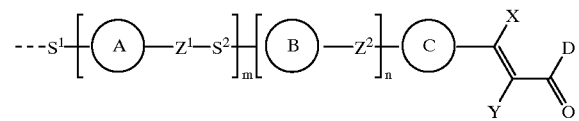

I wherein the broken line indicates the point of linkage to the polymer main chain and wherein
A, B each independently of the other represents unsubstituted or optionally fluoro-, chloro-, cyano-, alkyl-, alkoxy-, fluoroalkyl- or fluoroalkoxy-substituted phenylene, pyridine-2,5-diyl, pyrimidine-2,5-diyl, cyclohexane-1,4-diyl, piperidine-1,4-diyl, or piperazine-1,4-diyl;
C represents unsubstituted or optionally fluoro-, chloro-, cyano-, alkyl-, alkoxy-, fluoroalkyl- or fluoroalkoxy-substituted phenytene, or pyrimidine-2,5-diyl, pyridine-2,5-diyl, 2,5-thiophenylene, 2,5-furanylene, 1,4- or 2,6-naphthylene;
D represents —$OR^1$, —$NR^1R^4$, or an oxygen atom linked to ring C in the ortho-position to form a coumarin unit, wherein $R^1$ is an optionally fluoro- or chloro-substituted straight-chain or branched alkyl group having from 1 to 20 caron atoms or an optionally fluoro-, chloro-, alkyl- or alkoxy-substituted cycloalkyl radical having from 3 to 8 ring atoms, and $R^4$ is hydrogen or, independently, a further $R^1$ group;
$S^1$ represents a single covalent bond or a spacer unit;
$S^2$ represents a single covalent bond or a spacer unit;
X, Y each independently of the other represents hydrogen, fluorine, chlorine, cyano, or optionally fluoro-substituted alkyl having from 1 to 12 carbon atoms in which one $CH_2$ group or two or more non-adjacent $CH_2$ groups are optionally replaced by one or more of —O—, —CO—O—, —O—CO— and —CH=CH—;
$Z^1$, $Z^2$ each independently of the other represents a single covalent bond, —$(CH_2)_t$—, —O—, —CO—, —CO—O—, —O—CO—, —$NR^3$—, —CO—$NR^3$—, —$R^3$N—CO—, —$(CH_2)_u$—O—, —O—$(CH_2)_u$—, —$(CH_2)_u$—$NR^3$— or —$NR^3$—$(CH_2)_u$—; $R_3$ representing hydrogen or lower alkyl, and t representing an integer from 1 to 4 and u representing an integer from 1 to 3;
m represents 0 or 1; and
n represents 0 or 1;
wherein at least 25% of the monomer building blocks forming the main chain are linked to one or two side-chains of the general formula I.

* * * * *

UNITED STATES PATENT AND TRADEMARK OFFICE
CERTIFICATE OF CORRECTION

PATENT NO. : 6,340,506 B1
DATED : January 22, 2002
INVENTOR(S) : Richard Buchecker et al.

It is certified that error appears in the above-identified patent and that said Letters Patent is hereby corrected as shown below:

Title page,
Item [73], in the Assignee, "Rolic Ag" should read -- Rolic AG --.

Column 20,
Line 49, "alkyl," should read -- alkyl-, --.

Column 23,
Line 22, "–(CH$_2$)r" should read -- –(CH$_2$)r– --.

Column 24,
Line 26, "$Z^{1, Z2}$" should read -- $Z^1$, $Z^2$ --.
Line 61, "fluoro," should read -- fluoro-, --.
Line 66, after "–NR$^1$R$^4$", insert a comma.

Column 25,
Line 43, "alyl-," should read -- alkyl-, --.
Line 46, "piperaine-" should read -- piperazine- --.
Line 50, "2,5-thiophenytene" should read -- 2,5-thiophenylene --.
Line 57, "alkoxy-sutbstituted" should read -- alkoxy-substituted --.

Column 26,
Lines 16-17, "pholocrosslinkable" should read -- photocrosslinkable --
Line 17, "formula 1" should read -- formula I --.
Line 35, "phenytene" should read -- phenylene --.
Line 42, "caron" should read -- carbon --.

Signed and Sealed this

Seventh Day of May, 2002

*Attest:*

*Attesting Officer*

JAMES E. ROGAN
*Director of the United States Patent and Trademark Office*